US011537387B1

(12) United States Patent
Raman (10) Patent No.: US 11,537,387 B1
(45) Date of Patent: Dec. 27, 2022

(54) LOCK DATABASE CODE FOR ONLINE PATCHING

(71) Applicant: ORACLE INTERNATIONAL CORPORATION, Redwood Shores, CA (US)

(72) Inventor: Sridevi Raman, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/400,723

(22) Filed: Aug. 12, 2021

(51) Int. Cl.
*G06F 9/445* (2018.01)
*G06F 8/65* (2018.01)
*G06F 11/07* (2006.01)
*G06F 8/41* (2018.01)

(52) U.S. Cl.
CPC .............. *G06F 8/65* (2013.01); *G06F 8/41* (2013.01); *G06F 11/0721* (2013.01); *G06F 11/0769* (2013.01)

(58) Field of Classification Search
CPC .......... G06F 8/65; G06F 8/41; G06F 11/0721; G06F 11/0769
USPC .................................................. 717/168–178
See application file for complete search history.

(56) References Cited

U.S. PATENT DOCUMENTS

| | | | |
|---|---|---|---|
| 8,473,484 B2 | 6/2013 | Egan et al. | |
| 9,317,278 B1 * | 4/2016 | Walker | G06F 8/71 |
| 11,409,580 B2 * | 8/2022 | Craik | G06F 9/4881 |
| 2012/0310921 A1 | 12/2012 | Egan et al. | |
| 2015/0007156 A1 | 1/2015 | Tkach et al. | |

OTHER PUBLICATIONS

Carl W. Olofson, The Security Benefits of Self-Patching: Oracle Autonomous Database (White Paper), Sponsored by: Oracle Corp.; Copyright Oct. 2018, IDC #US44350118; pp. 1-5.
Oracle, 22 Patching Oracle Database; Oracle Enterprise Manager Administrator's Guide for Software and Server Provisioning and Patching 11g Release 1 (11.1.0.1.0); pp. 1-10; Copyright 1996, 2012; downloaded Jun. 25, 2021 from: https://docs.oracle.com/cd/E17559_01/em.111/e16599/pat_sidb.htm#/CHDHBEGA.
Oracle, Oracle Database, SQL Reference, 10g Release 2 (10.2) B14200-02; Dec. 2005; pp. 1-7.

* cited by examiner

*Primary Examiner* — Chuck O Kendall
(74) *Attorney, Agent, or Firm* — Kraguljac Law Group, LLC (57) ABSTRACT

Systems, methods, and other embodiments associated with patching database objects while a database system is online are described. In one embodiment, a patch command is defined and identifies a database code object, wherein the patch command is configured to modify code of the database code object. A serialized lock is requested from the database system for the database code object, wherein the serialized lock prohibits executing applications of the database system from accessing the database code object. In response to receiving the serialized lock from the database system, the code of the database code object is modified with a patch code to generate a modified database code object. The modified database code object is compiled and the serialized lock on the database code object is released to allow other executing applications to call and access the database code object.

20 Claims, 4 Drawing Sheets

LOCK DATABASE CODE FOR ONLINE PATCHING

BACKGROUND

Database code cannot be modified or overwritten when the database is online and in use. For example, when any application is calling or using the database code, the code cannot be overwritten by a newer version of the code, not even for a minor change. The database engine will throw an error if such an attempt is made. Thus, in prior database systems, applications using the database code must be shut down first and the database taken offline before patching any database code even for minor changes.

Typically, patching a database system requires taking the system offline, installing the code patch, and rebooting the system, which can take 10-30 minutes or more depending on the number of changes in the patch. In some Enterprise Resource Planning (ERP) systems, patching is performed in scheduled monthly cycles to upgrade code. However, all applications must be taken down (offline) to perform the upgrade, which requires some disruptive downtime.

To minimize the impact on users, patching is performed at a time when the database system has the fewest users, for example, during off-hours or late at night. However, patching the code still requires both downtime and staff time. Even at night, taking the database offline impacts or inconveniences some users.

In systems that have a 24×7 continuous availability requirement, taking the database system offline is not possible. To perform a patch in these systems, a second database system is set up that duplicates the main database. Copies of the software are loaded, the patches are applied, the patched system is tested, and then the systems are swapped. This approach usually results in a brief interruption as the main system is quiesced, any pending transactions are passed over to the patched system, and then the patched system comes online. Overall, patching requires extra staff effort, interrupts work, and disrupts the operations schedule. These disruptive activities can represent considerable cost in a database system.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that enable patching of database code while the database is online and at any desired time. Thus, the present system and method provide a technique for on-demand patching of code. In one embodiment, the present system provides zero downtime patching for minor database code changes. Furthermore, applications that are using the database need not be brought down for the sake of minor patching of database code. In one embodiment, the present system implements a facility to lock database code in a database session that is opened for the purpose of patching the code while the database is still online.

In some instances, database code is patched to fix a bug by changing only a few characters or a couple of lines of code. Such a fix may take only milliseconds when performed by the present patching technique while the database remains online. The same fix would require about 30 minutes of downtime if the database is taken offline to perform the patch. This lengthy time is cause by the requirement to bring down all applications in the database, applying the patch, testing the system, and then bringing up the applications back online. Therefore, clients and service level agreements (SLAs) that require near zero-downtime get impacted with such lengthy patching downtimes. Furthermore, a greater impact on system availability occurs when an emergency patch is performed and the system is taken offline during an unscheduled period.

The present patching technique provides an improvement and advantage to modifying objects to fix bugs. Many times in a software system, bugs are discovered post release or post patching and may require emergency fixes. With the present patching technique, bug fixes and patches can be performed in real-time and on-demand at any time without bringing down the system. This ensures zero-down time of the system for performing patches.

Definitions

As used herein, a "data command" is a data statement that performs data actions within a database. Data commands/statements are submitted by users to the database that request specified data actions to be performed on data values in the database. These data actions include querying data, creating data, reading data, writing data, and/or deleting data. Data commands do not and cannot change any code or structure of the database. It should be understood that data values stored in the database are not database logic or code that is executable.

As used herein, a "patch command" is not a data command/statement and does not change data values in the database. In one embodiment, the patch command refers to a combination of statements/actions implemented to perform the present patching technique where the patching technique modifies a selected object (e.g., selected database code object) while the database system is online.

In one embodiment based on SQL, the combination of statements may include an ALTER statement combined with a LOCK statement to acquire a lock on a selected object. For example, the format/syntax of the statement is: ALTER <object type> <object name> LOCK; where object type identifies the object type such as a package, a package body, a view, or other database code object. The object name identifies the name of the object. This will be described in more detail herein. Of course, if using different programming languages, these statement names may be different.

The general configuration is a command/statement to modify an object where the statement identifies the object and requests a lock on the object.

As used herein, a "package" is a collection of related procedures, functions, and other program objects stored together in the database. A package is identified by a name or ID such as "pkg01." A package includes a package specification and a package body. The package specification declares the objects in the package and identifies input and output parameters for functions in the package. The package body defines these objects and contains the actual executable logic/code of the functions in the package. The package, the specification, and the package body are each different types of database code objects that may be identified and targeted for patching.

As used herein, a "view" is another type of database code object that can reside in a database system and be targeted for patching. A view is a defined query used to retrieve selected data from selected data tables. The query is given a name and thus is referred to a named query. The named query may be identified by its name and reused and/or modified.

Database System Overview

Figure 1:
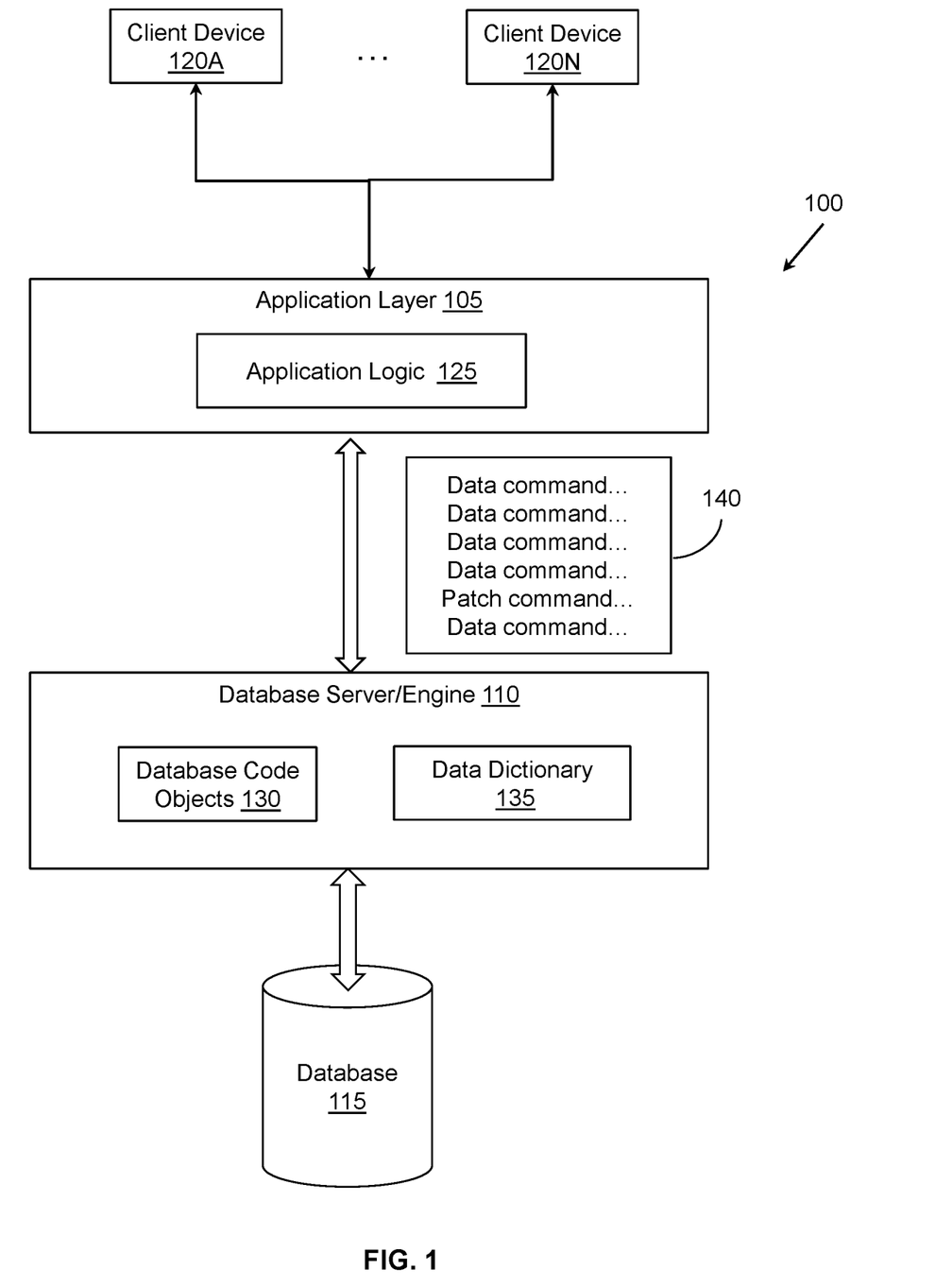
FIG. 1 illustrates one embodiment of a database system associated with processing a patch command.

With reference to FIG. 1, one embodiment of a database system 100 is illustrated in a simplified form that is configured for online patching. The database system 100 may include an application layer 105, a database server 110, and a database 115. Of course, there may be multiple database servers 110 (or server instances), and multiple databases 115. The application layer 105, which may include an application server, is configured to communicate with any number of client devices 120A-120N and receive database requests or commands from the client devices to perform actions on data in the database 115. Database systems may be very complex and have many different types of configurations, which are beyond the scope of this disclosure. For the present discussion, the simplified overview is described to provide an example environment in which the present patching system may operate. The present patching system and method is not limited to the described database system.

The application layer 105 includes application logic 125 that includes application-specific code for performing functions associated with the database. The application-specific code may be configured in different ways depending on the programming language used. For example using Java, code may be organized or configured in packages.

For purposes of discussion, the objects including packages, package specifications, package bodies, and views are referred to herein as database code objects 130 that reside in the database server 110. A package is a collection of related procedures, functions, and other program objects stored together in the database as previously defined. A package includes a package specification and a package body. A view is a named query and is another type of object that can reside in the database system 100. In one embodiment, these are example objects that the present patching technique is directed to. The present patching technique may also be performed on other executable code objects that may reside in the database server 110.

The database server 110 (or database server instance) is a server that comprises a combination of software and allocation of resources from a node. In one embodiment, the database server 110 includes a combination of integrated software components and an allocation of computational resources, such as memory, a node (i.e., a computing device), and/or processes on the node for executing the integrated software components on a processor. The combination of the software and computational resources being dedicated to performing a particular function on behalf of one or more clients (such as client devices 120A-120N). The database server 110 maintains access to and manages data in the database 115.

The database server 110 is sometimes referred to as a "database engine" since it contains executable code and software components for performing operations on data including creating, reading, updating, and deleting data to/from the database 115.

A data dictionary 135 is a file, a set of files, and/or a set of tables that contains the database system's metadata and relationships between data. The data dictionary 135 defines schema objects in the database (tables, views, indexes, clusters, synonyms, sequences, procedures, functions, packages, triggers, and so on). The data dictionary 135 shows and tracks all database objects in memory of the database with a variety of identification and status attributes for each object. For example, the attributes for an object may include but is not limited to: object ID, object name, object type, username using the object, size of object in memory, object status, and so on.

In one embodiment, the object status field contains a current status of the database object as the object is used in the database system 100. For example, the status may show that the object is being used or is free/available for use. There may be multiple types of status values used in the status field and/or there may be more than one type of status field in the data dictionary 135. For example, one type of object status show if the object is "locked" or unlocked for use. If a database object is being used by an application, the data dictionary 135 will have the object status field for the object marked as "locked," "locked for modification," "locked for maintenance," or other similar identifier. If an object is locked, it is not available for use by anyone or any application until it is unlocked.

For the present disclosure, the object status field of an object is used by the present system as described herein. As will be described in the following sections, the present patching technique provides the ability to patch code of an object while the database system 100 is online. In one embodiment, a patch command is submitted and inserted with data commands 140 being processed by the database system 100 where the database system 100 is not aware that code is being modified as a result of the patch command. In this manner, the database system 100 processes the patch command along with other data commands while the database system is online. In one embodiment, being online refers to a state when the application layer 105 and the database code 130 are actively accessing and modifying data in the database 115, and offline refers to a state when applications cannot and are not accessing the database.

Patch Command Embodiment

Figure 2:
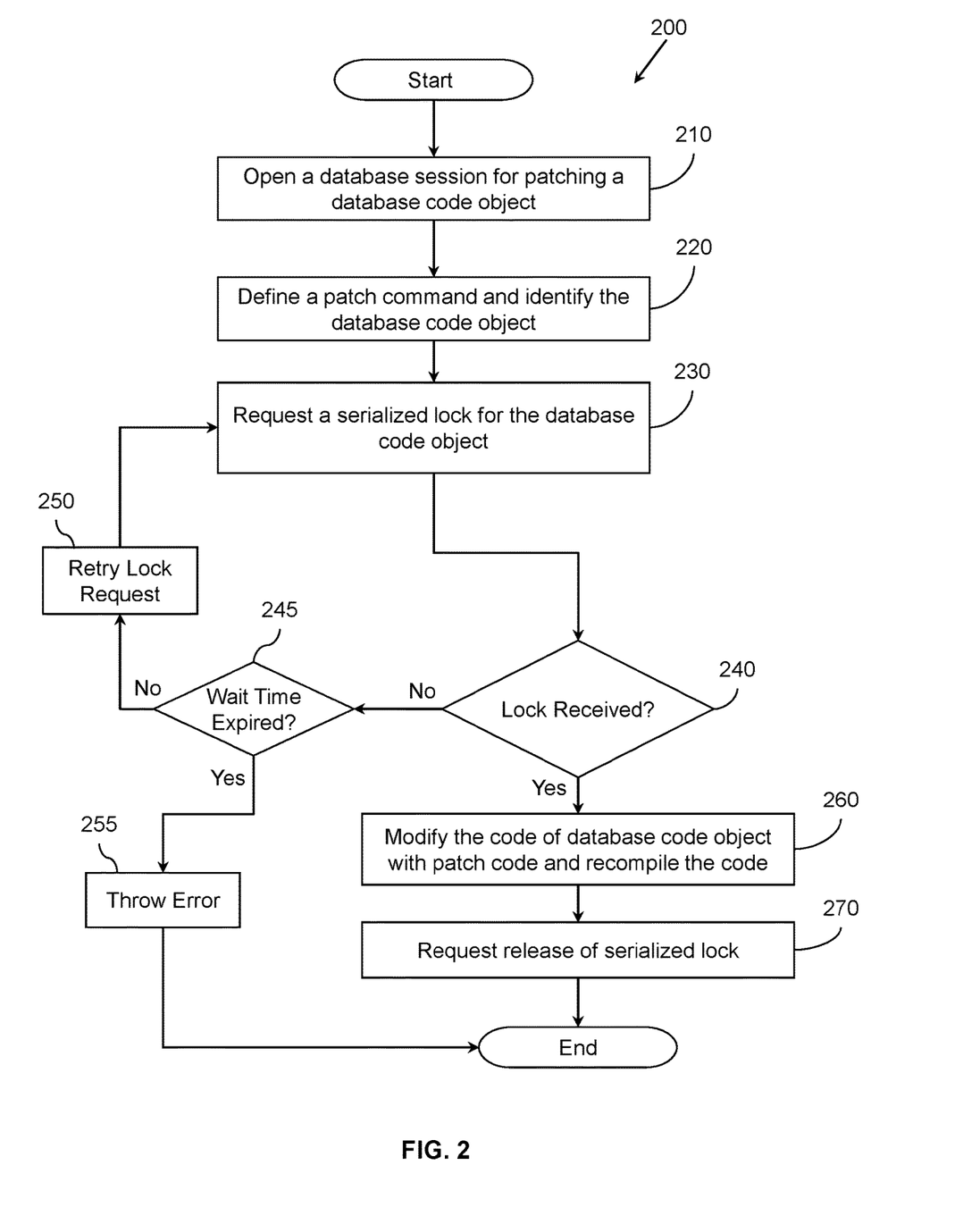
FIG. 2 illustrates one embodiment of a method associated with a patch command and patching code.

With reference to FIG. 2, in one embodiment of a method 200 associated with patching a targeted object or code with the present patch command while the database system remains online. Method 200 may be initiated by a database administrator (DBA) or other person with appropriate authorization and access to the database system 100.

At block 210, a database session is opened for patching a database code object while the database system is online. In one embodiment, a session represents and establishes a connection between client software and the database that stores its persistent objects.

At block 220, a patch command is defined in the database session and identifies the database code object (e.g., the target objects of the patch), wherein the patch command is configured to modify code of the database code object. In some embodiments, the identified database code object may include multiple target objects that will be patched together in the session.

At block 230, a serialized lock is requested from the database system for the database code object. In one embodiment, once a serialize lock is placed on the object, the serialized lock prohibits other executing applications of the database system 100 from accessing or using the database code object. The database system may include one or more error codes that are throw in this case to indicate when code is locked for patching and cannot be accessed.

However, the lock cannot be given to the requestor if the object is locked by another user, application, or object. Actions taken by the database system to determine if a lock is available is described with reference to FIG. 3, block 350.

With continued reference to FIG. 2, at 240, a determination is made whether the requested lock was received or not from the database system. If the target object code is currently locked and being used by another component of the database system 100, then the requested lock from the patch command is denied. An error may also be thrown by the database system indicating that the lock is denied, or the lock request may wait a specified time period and request the lock again.

In one embodiment, to verify that the requested lock was received for the patch command in the session, a command may be submitted to the database system to list all locked code. This command may be, for example, SHOW Locked Code Objects. The database system responds by showing a list of code objects that are locked in the current session. If any of the database code objects (that are identified in the patch command) are not all listed as locked, then the patch should not be performed. To ensure the integrity of database, the administrator handling the patch should ensure that a LOCK on all requested target objects is received before changing any code.

In one embodiment, the lock request in the patch command may include a "wait" time period. For example, the statement "ALTER package body pkg01 LOCK WAIT 60" instructs the system to wait 60 seconds when the lock is not yet available or received. If the lock request is denied by the system, then the lock request is place in a queue for resubmission and the system starts a timer to monitor how long the request is denied. If the timer has not passed the specified or default wait time (block 245 wait time not expired), then the lock request is retried (block 250). The retrying repeats until the wait time is expired or the lock is received. If the requested lock is not available within the specified or default wait time (e.g., 60 seconds) then an error is thrown in the session that indicates the lock request failed (block 255). As such, the patching process cannot continue and ends. However, if the serialized lock is given to the requesting patch command at block 240, the database system 100 marks the current status of the target object code as "locked" in the data dictionary 135 and the method proceeds to block 260.

At block 260, in response to receiving the serialized lock from the database system, the source code of the database code object is modified with a patch code to generate a modified database code object. This may include revising portions of the code and/or replacing portions of code with a new version. After modification is complete, the modified database code object is compiled into an executable form.

At block 270, upon completion of the compiling, a release of the serialized lock on the database code object is requested. Once the lock is released by the database system, the status of the code object is marked as "free" (or other equivalent status). With a free status, this allows other executing applications of the database system to call and access the database code object as usual. Thus, the database code object has been patched while the database system continued to be online and operating with no down time.

In another embodiment of method 200, the following functions/actions may be performed. For example, after the patch command is defined, the patch command is submitted to the database system 100 for execution within a plurality of data commands that are being processed by the database system. In this manner, the database system is unaware that the patch command is modifying code since the patch command is embedded within data commands that are requesting actions on data values in the database. In other words, the patch command is submitted to the database system for execution by inserting the patch command with data commands that are currently active and being processed by the database system. Thus, the database system is not taken offline to perform the patch command.

With reference to block 230, in one embodiment, in response to the serialized lock being requested, the database system is caused to determine a current status (lock status) of the database code object as being a free status or a locked. The lock status is checked in the data dictionary that maintains the status of database objects. If no other database component or application is accessing or using the database code object, the status will be free or otherwise unlocked and thus available to be locked.

In response to determining that the database code object has the free status, the database system changes the free status to the locked status and assigns the identified database code object to the patch command. The assignment may include assigning the lock to the database session of the patch command and/or the user that submitted the patch command. Conversely, in response to determining that the database code object has the locked status, (i) wait a selected time period and recheck the current status, or (ii) issue an error message and prohibit the patch command from being executed.

Examples

Table 1 shows an example sequence of commands and/or actions that may occur for performing an online patch. The patch is performed on a target database object named "pkg01," which has an object type of "package body." The actions are shown between times T1 to T4. To perform operations in the database, a database session is opened. The patch command and patching operations are in database Session 1. Since the database is online during patching, other applications are still operating with the database. This is shown by database Session 2 from a different application attempting to call or use pkg01 after pkg01 is locked by the patch command in session 1.

TABLE 1

Session 1 at time T1:

ALTER package body pkg01 LOCK;
This statement requests modification of package body (code) of object "pkg01" and requests a lock on the object. Lock is obtained.
Syntax being used is ALTER <object type> <object name> LOCK
Multiple object types and object names may be identified as target objects
Session 2 at time T2:

Application side: This is different application trying to call the locked

TABLE 1-continued

```
package pkg01 in a different session 2:
Begin pkg01.proc1; end;
Statement is trying to run code of pkg01 in session 2
Pkg01 is locked by session 1. Two ways for system to handle this:
(1) Wait for lock to be released on pkg01 at time T4, then run code, or
(2) Throw a lock error, which the application should handle.
Since patching of package pkg01 and compilation takes only a few
seconds or milliseconds, method (1) is preferred. Waiting also avoids
unnecessary erroring out of the application, which happens in method (2).
Session 1 at Time T3:

Returning to patching command (session 1) and steps:
Create or replace package body pkg01 . . . etc . . . ;
The code/logic in the package body is created, modified, or replaced
based on what type of patching is performed. This may be performed by a
script.
Package pkg01 is then compiled into executable form
Session 1 at Time T4:

When compiling is done, unlock all locked objects.
ALTER package body pkg01 UNLOCK;
Unlocks pkg01 in the session
The package pkg01 is now available to other sessions for use
```

Database System Online Patching Embodiment

Figure 3:
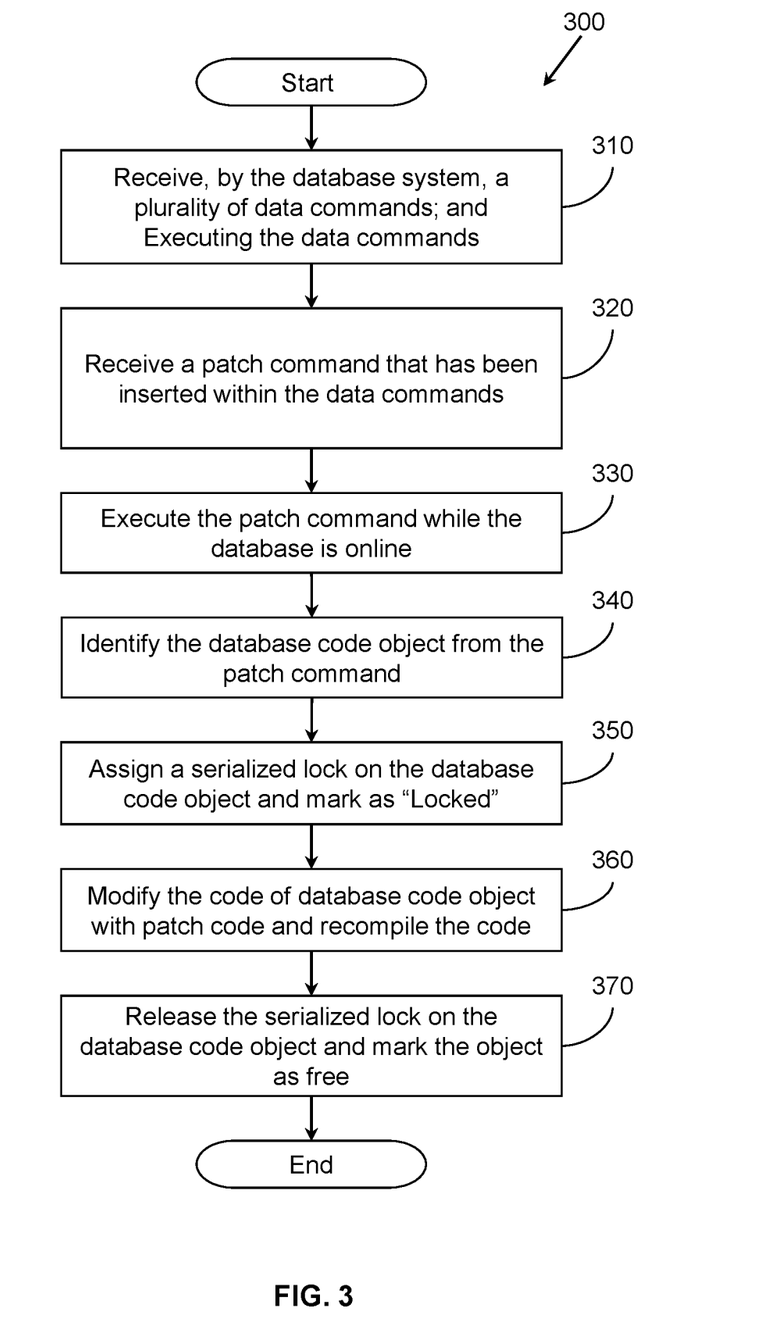
FIG. 3 illustrates one embodiment of a method associated with a database system performing a patch while the system is online.

With reference to FIG. 3, one embodiment of a method 300 is illustrated that is associated a database system's operations for performing online patching of a database object. Method 300 is discussed with reference to the database system 100 of FIG. 1 and the patch command of FIG. 2.

At block 310, the database system 100 is online and receiving a plurality of data commands/requests from client devices. As explained previously, a data command requests a function that accesses and/or manipulates data values stored in the database. The database system 100 is configured to process and execute the data commands in an order. The order may be implemented in different ways for different types of systems. For example, the data commands may be executed in parallel, concurrently in sessions, sequentially, first-in first-out, based on priorities, combinations of these, and/or other processing techniques.

At block 320, at some point during processing of commands/requests, the database system receives a patch command that has been submitted to the database system. In one embodiment, the patch command is submitted and received by the system along with (or concurrently with) the plurality of data commands that have also been submitted for processing. Thus, the patch command is, in a sense, inserted within the data commands since the database system is not stopped and is not taken offline in order to process the patch command. From a different perspective, the patch command can be viewed as hidden within the data commands or disguised as a data command since the database system is not aware that a patching operation is about to occur. As previously explained under FIG. 2, the patch command requests modification of a database code object, where the object may include executable code.

In one embodiment, the patch command is received from a database session that was opened for patching the database code object while the database system is online. The database session is separate from one or more other database sessions that were opened for and include the data commands. In this manner, the patch command may be more easily identified and monitored by a database administrator due to its assigned database session. This allows the database administrator to watch for errors if the lock is not received and to monitor execution of the patch command. Within the database session, the patch command is defined including an identification of the database code object to be patched as previously described. The patch command also includes a request for a serialized lock in the database session for the identified database code object. If the lock is granted, then the lock is assigned to the requesting database session. In other embodiments, the patch command and/or the data commands may be submitted for execution using other protocols or platforms that do not include sessions.

At block 330, in response to receiving the patch command while the database system is online, the database system executes the patch command. The execution may include the following actions in blocks 340-370. In one embodiment, the patch command is configured similar to that described previously.

At block 340, the database code object is identified from the patch command. For example, using the previous patch command configuration of "ALTER package body pkg01 LOCK," the identified object is pkg01 based on a predefined syntax of the ALTER statement and parsing the parameters of the statement. In other embodiments, other statements may be used to initiate a patching operation and may have a different syntax. Additionally, the patch command requests a LOCK on the identified database code object.

At block 350, the database system checks the status of the identified object and if the status is free (meaning the object is not locked or being used by another application), the system assigns a serialized lock on the identified database code object and marks the object as "locked" in the data dictionary. In one embodiment, the process of checking the status is similar to blocks 230, 240 and 250 of FIG. 2. Additional options for processing a lock request are described below. After the lock is assigned to the patch command and the associated database session, the serialized lock gives exclusive access to the identified database code. Thus, the lock prohibits other applications of the database system from accessing the identified database code object.

At block 360, code or other portions of the identified database code object are modified with a patch code while the database system is online and continues to process the plurality of data commands. In one embodiment, the patch code may be included with the patch command and may specified changes in the code to fix a bug(s). Fixing a bug may be as simple as changing a few characters in the source code of the object or replacing a couple of lines of code. The entire object may also be replaced with a new version of code.

In another embodiment, a separate script is configured to perform the modification to the database code object rather than putting the patch code in the patch command. The script may include statements for modifying portions of source code and/or replacing the entire code of the database code object with new code. The script is submitted for execution to the database system while the serialize lock is still assigned and the modifications are performed.

After the modification is completed, the identified database code object is compiled into executable form. If the compiling produces any errors, an administrator that is handling the patch will take appropriate steps to correct the errors and recompile the code. If the compiling completes without errors, the process continues.

At block 370, after the patched code is compiled without errors, the serialized lock on the identified database code object is released. The database system changes the status of the object to "free" (or other unlocked/available status) in the data dictionary 135. Once unlocked, other applications of the database system are permitted to call and access the database code object that was patched. The database system proceeds to operate as usual.

Alternate Embodiments

In another embodiment, the patching command may be subject to specified restrictions that prohibit certain types of modifications. The database system may be configured to throw error if an object is marked as "locked" for modification by a patch command and the patch tries to change signature of the object. For example, changing the signature of an object may include:

(i) Changes to input or output parameters of any of the units in a package body; and/or (ii) changes to a column name, column list or datatype of a view.

One restriction rule may be that input parameters and output parameters of packages cannot be changed. For example, let package A include code that calls package B (X, Y), where X and Y are input/output parameters. If the input parameters are patched and changed to become B (X, X2, Z), then the code in package A will cause an error when it calls B (X, Y). Thus, a patch operation that attempts to change parameters may be flagged, cause an error message, and/or be prohibited.

A second restriction rule may be that the column name or column list cannot be changed in a view. As previously described, a view is a virtual table that is created from a result of a query on other data tables. A view contains rows and columns, just like a real table. Let View01 contain column names EmpID, Employee_name, and Phone. If a patch changes Employee_name column to be Emp_name, then existing applications will receive errors since their code is based on the original column name. For example, a code statement that says "Select Employee_name from View01" will cause an error since View01 no longer has a column "Employee_name." Thus, a patch operation that attempts to change columns in a view may be flagged, cause an error message, and/or be prohibited.

A third restriction rule may be that dependent code is not impacted or modified. For example, let a first code object be dependent on a second code object. If the second code object is modified, then errors may occur in the first code object since the first code object is still executing based on (and expecting) the original code of the second code object, which is now different. Thus, a patch operation that attempts to change dependent code may be flagged, cause an error message, and/or be prohibited.

In another embodiment, with reference to block 350 in FIG. 3, the database system 100 may processes a lock request on the target object as follows.

Throw an error if LOCK cannot be obtained within specified time (Wait time). When LOCK WAIT <N seconds> is specified with a list of multiple target code objects in the patch command, the session will wait N seconds for all the code objects specified in the list to be marked as "locked for modification." If one or more of the target code objects in the list specified cannot be locked, an error is thrown. And, if any remaining code objects were able to be locked, those locks are released and the patching is stopped. All target objects should be locked before the patching continues.

In another embodiment, when a patch is completed and its database session exits (gracefully or otherwise) without UNLOCKing the target code objects, the database system is configured to automatically unlock the target code objects. This is similar to releasing locks of rows if a session is killed.

Overall, the present system and method provide a technique for on-demand patching of code. In one embodiment, the present system provides zero downtime patching for minor database code changes. As described, applications that are using the database need not be brought down for the sake of minor patching of database code. The present patching technique provides an improvement and advantage to modifying objects to fix bugs.

Cloud or Enterprise Embodiments

In one embodiment, the database system 100 is a computing/data processing system including an application or collection of distributed applications for enterprise organizations. The applications and database system 100 may be configured to operate with or be implemented as a cloud-based networking system, a software as a service (SaaS) architecture, or other type of networked computing solution. In one embodiment the database system may include a centralized server-side application that provides at least the functions disclosed herein and that is accessed by many users via computing devices/terminals communicating with the database system 100 over a computer network.

In one embodiment, one or more of the components described herein are configured as program modules stored in a non-transitory computer readable medium and/or in computer memory. The program modules are configured with stored instructions that when executed by at least a processor of a computing device cause the computing device to perform the corresponding function(s) as described herein.

Computing Device Embodiment

Figure 4:
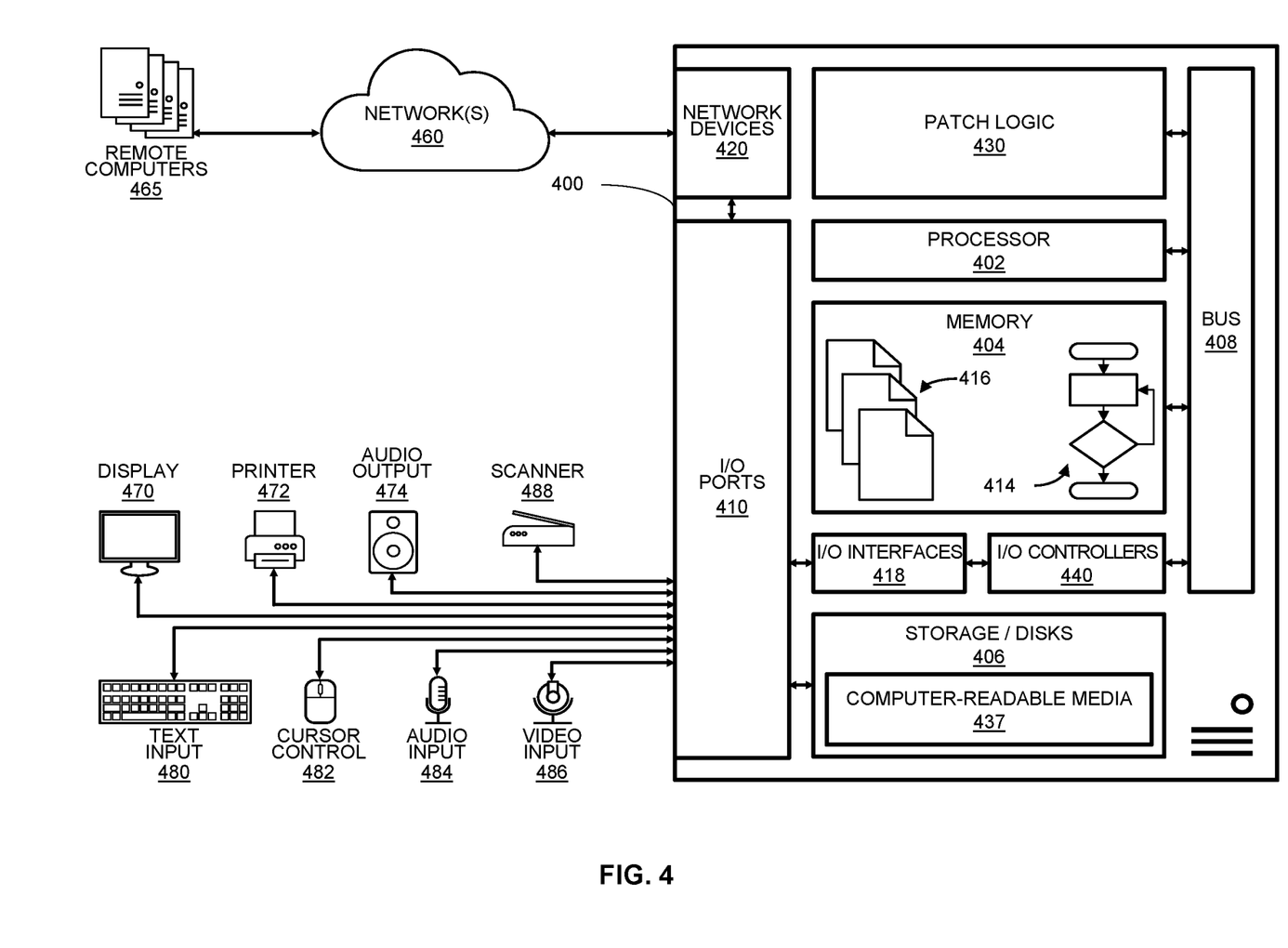
FIG. 4 illustrates an embodiment of a computing system configured with the example systems and/or methods disclosed.

FIG. 4 illustrates an example computing device that is configured and/or programmed as a special purpose computing device with one or more of the example systems and methods described herein, and/or equivalents. The example computing device may be a computer 400 that includes at least one hardware processor 402, a memory 404, and input/output ports 410 operably connected by a bus 408. In one example, the computer 400 may include patch logic 430 configured to facilitate the patch command and associated patching technique similar to those shown in FIGS. 2 and 3. In different examples, the patch logic 430 may be implemented in hardware, a non-transitory computer-readable medium with stored instructions, firmware, and/or combinations thereof. While the logic 430 is illustrated as a hardware component attached to the bus 408, it is to be appreciated that in other embodiments, the logic 430 could be implemented in the processor 402, stored in memory 404, or stored in disk 406.

In one embodiment, patch logic 430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform the operations of patch logic 430. The means may also be implemented as stored computer executable instructions that are presented to computer 400 as data 416 that are temporarily stored in memory 404 and then executed by processor 402.

Logic 430 may also provide means (e.g., hardware, non-transitory computer-readable medium that stores executable instructions, firmware) for performing the operations of patch logic 430.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output (I/O) interface (e.g., card, device) 418 and an input/output port 410 that are controlled by at least an input/output (I/O) controller 440. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with, control, and/or be controlled by input/output (I/O) devices via the input/output (I/O) controller 440, the I/O interfaces 418, and the input/output ports 410. Input/output devices may include, for example, one or more displays 470, printers 472 (such as inkjet, laser, or 3D printers), audio output devices 474 (such as speakers or headphones), text input devices 480 (such as keyboards), cursor control devices 482 for pointing and selection inputs (such as mice, trackballs, touch screens, joysticks, pointing sticks, electronic styluses, electronic pen tablets), audio input devices 484 (such as microphones or external audio players), video input devices 486 (such as video and still cameras, or external video players), image scanners 488, video cards (not shown), disks 406, network devices 420, and so on. The input/output ports 410 may include, for example, serial ports, parallel ports, and USB ports.

The computer 400 can operate in a network environment and thus may be connected to the network devices 420 via the I/O interfaces 418, and/or the I/O ports 410. Through the network devices 420, the computer 400 may interact with a network 460. Through the network, the computer 400 may be logically connected to remote computers 465. Networks with which the computer 400 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and/or other implemented storage structure. A data structure may be formed from and contain many other data structures (e.g., a database may include multiple data tables and include many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a hardware microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium that includes stored thereon computer-executable instructions that when executed by at least a processor of a computer cause the computer to:
   in a database system, open a database session for patching a database code object while the database system is online;
   define a patch command in the database session and identify the database code object, wherein the patch command is configured to modify code of the database code object;
   request a serialized lock from the database system for the database code object, wherein the serialized lock prohibits executing applications of the database system from accessing the database code object;
   in response to receiving the serialized lock from the database system, modify the code of the database code object with a patch code to generate a modified database code object;
   compile the modified database code object; and
   upon completion of the compiling, request a release of the serialized lock on the database code object to allow the executing applications of the database system to call and access the database code object.

2. The non-transitory computer-readable medium of claim 1, further comprising instructions that when executed by at least the processor cause the processor to:
   after the patch command is defined, submit the patch command to the database system for execution within a plurality of data commands that are being processed by the database system;
   wherein the database system is unaware that the patch command is modifying the code.

3. The non-transitory computer-readable medium of claim 1, further comprising instructions that when executed by at least the processor cause the processor to:
   after the patch command is defined, submit the patch command to the database system for execution by inserting the patch command with a plurality of data commands that are currently active and being processed by the database system;
   wherein the database system is not taken offline to perform the patch command.

4. The non-transitory computer-readable medium of claim 1, wherein the patch command is not a data command and does not change data values in the database.

5. The non-transitory computer-readable medium of claim 1, further comprising instructions that when executed by at least the processor cause the processor to:
   in response to the serialized lock being requested, the database system is caused to:
   determine a current status of the database code object as being a free status or a locked status;
   in response to determining that the database code object has the free status, change the free status to the locked status and assigning the identified database code to the patch command; and
   in response to determining that the database code object has the locked status, (i) wait a selected time period and rechecking the current status, or (ii) issue an error message and prohibiting the patch command from being executed.

6. The non-transitory computer-readable medium of claim 1, further comprising instructions that when executed by at least the processor cause the processor to perform the patch command on-demand.

7. A computer-implemented method, the method comprising:
receiving, by a database system, a plurality of data commands wherein a data command requests a function that manipulates data values stored in a database;
executing the plurality of data commands in an order;
receiving a patch command that is inserted within the plurality of data commands, wherein the patch command requests modification of a database code object that includes code in the database system;
in response to receiving the patch command while the database system is online, execute the patch command comprising:
identifying the database code object from the patch command;
assigning a serialized lock on the identified database code object, wherein the serialized lock prohibits applications of the database system from accessing the identified database code object;
modifying code within the identified database code object with a patch code while the database system is online and continues to process the plurality of data commands;
compiling the identified database code object after being modified; and
releasing the serialized lock on the identified database code object to allow the applications of the database system to call and access the identified database code object.

8. The method of claim 7, wherein the function from the data command that manipulates data values stored in the database includes adding data values, deleting data values, or modifying data values; and
wherein the patch command is not a data command and does not change data values in the database.

9. The method of claim 7, wherein the patch command is inserted for execution along with the plurality of data commands that are currently active, wherein the database system is not taken offline to perform the patch command.

10. The method of claim 7, further comprising:
opening a database session for patching the database code object while the database system is online;
defining the patch command in the database session and identifying the database code object;
requesting the serialized lock in the database session for the identified database code object; and
submitting the patch command to the database system for execution, wherein the database system is unaware that the patch command is modifying code by inserting the patch command within the plurality of data commands.

11. The method of claim 7, wherein providing the serialized lock on the identified database code object comprises:
determining a current status of the identified database code object as being a free status or a locked status;
in response to determining that the identified database code object has the free status, changing the free status to the locked status and assigning the identified database code to the patch command; and
in response to determining that the identified database code object has the locked status, (i) waiting a selected time period and rechecking the current status, or (ii) issuing an error message and prohibiting the patch command from being executed.

12. The method of claim 7, further comprising:
in response to an application attempting to access the identified database code object while the serialized lock is assigned to the patch command, throwing an error to the application and prohibiting the access by the application.

13. A database system, comprising:
at least one processor connected to at least one memory;
at least one database containing data;
a database engine configured to process data commands to manipulate the data in the at least one database;
a plurality of executable database code objects configured to be executable by the database engine and configured to perform functions on the data when executed;
wherein the database system is configured to:
receive a plurality of data commands wherein a data command requests a function that manipulates data values stored in a database;
execute the plurality of data commands in an order;
receive a patch command that is inserted within the plurality of data commands, wherein the patch command requests modification of a database code object that includes executable code in the database system;
in response to receiving the patch command while the database system is online, execute the patch command that causes the database system to:
identify the database code object from the patch command;
assign a serialized lock on the identified database code object, wherein the serialized lock prohibits applications of the database system from accessing the identified database code object;
modify code within the identified database code object with a patch code from the patch command while the database system is online and continues to process the plurality of data commands;
compile the identified database code object after being modified; and
release the serialized lock on the identified database code object to allow the applications of the database system to call and access the identified database code object.

14. The database system of claim 13, wherein the function from the data command that manipulates data values stored in the database includes adding data values, deleting data values, or modifying data values; and
wherein the patch command is not a data command and does not change data values in the database.

15. The database system of claim 13, wherein database system is configured to, in response to receiving the patch command:
insert the patch command for execution along with the plurality of data commands that are currently active and being processed by the database system, wherein the database system is not taken offline to perform the patch command.

16. The database system of claim 13, wherein, when the patch command is executed by the database system, the database system is configured to:
open a database session for patching the identified database code object while the database system is online; and
determine a current status of the identified database code object and if the current status is a free status, assign the serialized lock on the identified database code object for access only by the patch command;

wherein the database system is maintained in an online state and executing the plurality of data commands.

17. The database system of claim 13, wherein the database system is further configured to:

in response to an application attempting to access the identified database code object while the serialized lock is assigned to the patch command, throwing an error to the application and prohibiting the access by the application.

18. The database system of claim 13, wherein the database system includes an application layer and wherein the database code object resides in the application layer.

19. The database system of claim 13, wherein the database system is configured to perform the patch command and modify the identified database code object on-demand while the database system is online.

20. The database system of claim 13, wherein the database system is configured to, prior to assigning of the serialized lock on the identified database code object:

determine a current status of the identified database code object as being a free status or a locked status;

in response to determining that the identified database code object has the free status, changing the free status to the locked status and assigning the identified database code to the patch command; and in response to determining that the identified database code object has the locked status, (i) waiting a selected time period and rechecking the current status, or (ii) issuing an error message and prohibiting the patch command from being executed.

\* \* \* \* \*